US006704855B1

(12) United States Patent
Altman et al.

(10) Patent No.: US 6,704,855 B1
(45) Date of Patent: Mar. 9, 2004

(54) METHOD AND APPARATUS FOR REDUCING ENCODING NEEDS AND PORTS TO SHARED RESOURCES IN A PROCESSOR

(75) Inventors: Erik R. Altman, Danbury, CT (US); Jaime H. Moreno, Hartsdale, NY (US); Mayan Moudgill, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 09/585,766

(22) Filed: Jun. 2, 2000

(51) Int. Cl.[7] ............................................. G06F 9/30
(52) U.S. Cl. ..................................................... 712/210
(58) Field of Search ......................... 712/24, 214, 215, 712/216, 21, 210

(56) References Cited

U.S. PATENT DOCUMENTS

| | | |
|---|---|---|
| 5,129,067 A | 7/1992 | Johnson |
| 5,442,760 A | 8/1995 | Rustad et al. |
| 5,644,780 A | 7/1997 | Luick |
| 5,761,475 A * | 6/1998 | Yung et al. ................. 712/215 |
| 5,983,335 A * | 11/1999 | Dwyer, III ................... 712/215 |

OTHER PUBLICATIONS

Gwennap, "Intel, HP Make EPIC Disclosure IA–64 Instruction Set Goes Beyond Traditional RISC, VLIW", Microprocessor Report, vol. 11, No. 14, Oct. 27, 1997.
Johnson, "Superscalar Microprocessor Design", Prentince Hall Series in Innovative Technology, Prentince Hall, 1991.
Kathail, et al., "HPL PlayDoh Architecture Specification: Version 1.0", Computer Systems Laboratory, HLP–93–90, Feb., 1994.
Klaiber, "The Technology Behind Crusoe™ Processors", Transmeta Corporation, Jan. 2000.
Abnous, et al., "Architectural Design and Analysis of a VLIW Processor", Department of Electrical and Computer Engineering, University of California, Irvine, pp. 1–45. (no date).
Colwell, et al., "A VLIW Architecture for a Trace Scheduling Compiler", IEEE Transactions on Computers, vol. 37, No. 8, Aug. 1988, pp. 976–979.
Capitanio et al., "Partitioned Register Files for VLIWs: A Preliminary Analysis of Tradeoffs", IEEE, 1992, pp. 292–300.
Franklin et al., "A Fill–Unit Approach to Multiple Instruction Issue", MICRO 27—11/94 San Jose, CA, pp. 162–170.
Beck et al., "The Cydra 5 Minisupercomputer: Architecture and Implementation", The Journal of Supercomputing, vol. 7, (1993), pp. 143–180.
Tinker, Machine Language Manual, Version 0.999, beta, Apr. 1995, Dept. of Electrical and Computer Engineer, North Carolina State University.
Website: http://webdev2.pok.ibm.com/resource/tehcnology/POWER2.2.html, 2000.

* cited by examiner

Primary Examiner—Zarni Maung
(74) Attorney, Agent, or Firm—F. Chau & Associates, LLP (57) ABSTRACT

The present invention relates to a method for accessing elements from a shared resource to be used by consumers that perform actions according to corresponding operations. The method creates a packet of operations to be processed simultaneously, wherein the elements from the shared resource used by the operations are specified by source and destination identifier fields that are shared among the operations in such a way that the sum of all the elements from the shared resource used by the operations does not exceed a total number of identifiers available in the packet. The method also reads the elements from the shared resource according to the shared identifier fields specified in the packet. The method decodes a number of elements from the shared resource needed by each operation, by passing the operations to an operation decoder having a defined routing scheme based on the needs of the operations. The method also routes the elements to the consumers performing operations and resulting values to the shared resource, according to a routing signal of the operation decoder.

29 Claims, 7 Drawing Sheets

| No. Source Operands | | | | FU0 | | | FU1 | | FU2 | | | FU3 | |
|---|---|---|---|---|---|---|---|---|---|---|---|---|---|
| Op 1 | Op 2 | Op 3 | Op 4 | A0 | B0 | C0 | A1 | B1 | A2 | B2 | C2 | A3 | B3 |
| 0 | 0, 1 | 0, 1, 2, 3 | 0, 1, 2 | | | | D0 | | D3 | D1 | D2 | D5 | D4 |
| 0 | 2 | 0, 1, 2 | 0, 1, 2 | | | | D0 | D1 | D3 | D2 | | D5 | D4 |
| 0 | 2 | 3 | 0, 1 | | | | D0 | D1 | D3 | D2 | D4 | D5 | |
| 1 | 0 | 0, 1, 2, 3 | 0, 1, 2 | D0 | | | | | D3 | D1 | D2 | D5 | D4 |
| 1 | 1 | 0, 1, 2 | 0, 1, 2 | D0 | | | D2 | | D3 | D1 | | D5 | D4 |
| 1 | 1 | 3 | 0, 1 | D0 | | | D2 | | D3 | D1 | D4 | D5 | |
| 1 | 2 | 0, 1 | 0, 1, 2 | D0 | | | D2 | D1 | D3 | | | D5 | D4 |
| 1 | 2 | 2 | 0, 1 | D0 | | | D2 | D1 | D3 | D4 | | D5 | |
| 1 | 2 | 3 | 0 | D0 | | | D2 | D1 | D3 | D4 | D5 | | |
| 2 | 0 | 0, 1, 2 | 0, 1, 2 | D0 | D1 | | | | D3 | D2 | | D5 | D4 |
| 2 | 0 | 3 | 0, 1 | D0 | D1 | | | | D3 | D2 | D4 | D5 | |
| 2 | 1 | 0, 1 | 0, 1, 2 | D0 | D1 | | D2 | | D3 | | | D5 | D4 |
| 2 | 1 | 2 | 0, 1 | D0 | D1 | | D2 | | D3 | D4 | | D5 | |
| 2 | 1 | 3 | 0 | D0 | D1 | | D2 | | D3 | D4 | D5 | | |
| 2 | 2 | 0 | 0, 1, 2 | D0 | D1 | | D2 | D3 | | | | D5 | D4 |
| 2 | 2 | 1 | 0, 1 | D0 | D1 | | D2 | D3 | D5 | | | D4 | |
| 2 | 2 | 2 | 0 | D0 | D1 | | D2 | D3 | D5 | D4 | | | |
| 3 | 0 | 0, 1 | 0, 1, 2 | D0 | D1 | D2 | | | D3 | | | D5 | D4 |
| 3 | 0 | 2 | 0, 1 | D0 | D1 | D2 | | | D3 | D4 | | D5 | |
| 3 | 0 | 3 | 0 | D0 | D1 | D2 | | | D3 | D4 | D5 | | |
| 3 | 1 | 0 | 0, 1, 2 | D0 | D1 | D2 | D3 | | | | | D5 | D4 |
| 3 | 1 | 1 | 0, 1 | D0 | D1 | D2 | D3 | | D5 | | | D4 | |
| 3 | 1 | 2 | 0 | D0 | D1 | D2 | D3 | | D5 | D4 | | | |
| 3 | 2 | 0 | 0, 1 | D0 | D1 | D2 | D3 | D4 | | | | D5 | |
| 3 | 2 | 1 | 0 | D0 | D1 | D2 | D3 | D4 | D5 | | | | |

| Num Dests | FU0 | FU1 | FU2 | FU3 |
|---|---|---|---|---|
| 0,0,0,0 | | | | |
| 0,0,0,1 | | | | W0 |
| 0,0,1,0 | | | W2 | |
| 0,1,0,0 | | W1 | | |
| 1,0,0,0 | W0 | | | |
| 0,0,1,1 | | | W2 | W0 |
| 0,1,0,1 | | W1 | | W0 |
| 1,0,0,1 | W0 | | | W1 |
| 0,1,1,0 | | W1 | W2 | |
| 1,0,1,0 | W0 | | W2 | |
| 1,1,0,0 | W0 | W1 | | |
| 0,1,1,1 | | W1 | W2 | W0 |
| 1,0,1,1 | W0 | | W2 | W1 |
| 1,1,0,1 | W0 | W1 | | W2 |
| 1,1,1,0 | W0 | W1 | W2 | |

Functionality of OpDec

Write Values
W0 = FU0 * N01 + FU3 + N00
W1 = FU1 * N11 + FU3 + N10
W2 = FU2 * N21 + FU3 + N20

Write Enable Signals
EW0 = N01 + N31
EW1 = N11 + N10 * N31
EW2 = N21 + N20 * N31

$N_{ij}$ : Operation i has j destination registers
$FU_k$ : Output of Function Unit k Logic equations for OpDec

METHOD AND APPARATUS FOR REDUCING ENCODING NEEDS AND PORTS TO SHARED RESOURCES IN A PROCESSOR

BACKGROUND OF RELATED ART

1. Field of the Invention

The present invention relates to a method and apparatus for reducing encoding needs and reducing the number of ports to shared resources in a multi-operation (wide-issue) processor, and more particularly to a mechanism based on a set of identifier fields which are shared among operations (the consumers of a shared resource).

2. Description of Related Art

Wide-issue processors are characterized by their ability to specify multiple "operations" that are carried out simultaneously and which may share certain resources in the processor. This set of operations, or "packet," can be created either when the program is generated (static generation by a programmer, compiler or other means), or by some mechanism invoked while the operations are carried out (dynamic generation, for example, performed at the time instructions are fetched from main memory into an instruction cache or instruction buffer, or at the time when instructions are decoded, or in some other stage in the processor pipeline).

Figure 1:
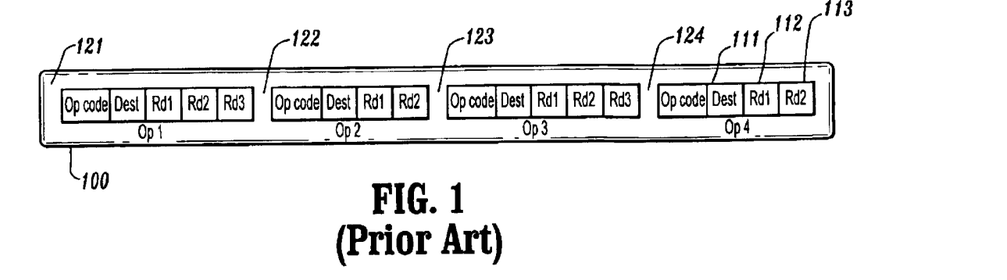
FIG. 1 is a diagram showing a conventional encoding of register fields in a long instruction.

Typically, the format of the multiple operations specified in a packet 100 contains a separate field for identifying the arguments used by each one of the operations, which are extracted from a collection of shared resources (for example, the various registers in a buffer or register file), as illustrated in FIG. 1. Furthermore, each of the identifier fields 111, 112 and 113 is associated with an independent port to access the shared resource, so that there is no conflict among the different operations 121–124 for accessing the shared resource. As a result, the number of ports to a shared resource needed in an implementation corresponds to the maximum number of identifiers that can be encoded in a packet 100. This format of a packet 100 is the approach used to specify the registers used by the primitive operations in Very-Long Instruction Word (VLIW) processors such as TRACE, CYDRA 5, ITANIUM, Phillips TRIMEDIA, among others. This format is also the approach implicitly used in processors which dynamically construct long-instructions such as those described in U.S. Pat. No. 5,442,760 and Franklin, M. & Smotherman, M., *A Fill-unit Approach to Multiple Instruction Issue*, Proceedings of the 27th International Conference on Microarchitecture, 1994, at 162–171.

However, a disadvantage of the above packet format is that, for packets with many primitive operations, large shared structures result from having independent ports to a shared resource for each operation. Moreover, some primitive operations actually use fewer than the maximum possible number of arguments or results. For example, a register-to-register primitive operation such as add or subtract uses three register fields and consequently three ports in a register file: two read ports to access the operands, and one write port to save the result of the operation. On the other hand, a load operation specifying a base register and a displacement uses only one read and one write port in the register file, whereas a store operation does not use a write port.

Therefore, a need exists for a method and system having efficient use of identifier fields for specifying arguments accessed in the shared resource.

Attempts have been made to reduce the number of ports to the register file in a wide-issue processor. One such attempt is the Power2 processor, available commercially from IBM, Inc., it provides the number of ports needed by replicating the register file. More specifically, the fixed-point execution unit contains two register files with 4-read and 4-write ports; each of two functional units reads operands from one of the register files, but write ports are common to both register files. In other words, read ports are distributed across the register files whereas write ports are replicated in both modules.

In the context of VLIW processors, providing the needed ports in the register file has been addressed by the use of partitioned register files. Registers and ports are distributed across different modules, and data are either moved or copied among the modules through the execution of specific instructions, as in TRACE and Cydra 5. A variation on this approach includes replicating registers throughout some of the modules so that read ports are distributed and write ports are replicated across the corresponding modules.

U.S. Pat. No. 5,129,067 describes a group of instructions (primitive operations), fetched from the cache memory, potentially in some predecoded state. The patent is based on arbitration logic to dynamically resolve contention for the ports to the register file. Generally, the patent provides (1) arbitration logic for arbitrating conflicts among the operations in accessing the register file, based on arbitration data corresponding to each of the operations, and (2) a multiplexing unit for selectively supplying the N register identifiers to the M available ports in response to control signals generated by the arbitration logic. More specifically, the patent addresses the problem of long-instructions with N register-operand identifiers on a processor having M ports to the register file, wherein M<N; the values of N and M considered in the embodiments described are 4–8 and 2–4, respectively. Such an approach is not adequate for the case of executing many primitive operations simultaneously (N>8), as is the trend nowadays, due to the exponentially increasing hardware complexity involved; in addition, the delay across the arbitration logic grows very fast for a larger number of possible operands.

A solution related to the one proposed in U.S. Pat. No. 5,129,067 (described above) is further developed by Johnson, M., Superscalar Microprocessor Design, (Prentice Hall 1991), indicating that a four-operation decoder suffers minor degradation when there are only four read ports in the register file. The publication also relates to a superscalar processor, for the case of a four-operation decoder. The scheme proposes a long-instruction format with a separate register access field which specifies the register identifiers for four source operands and four destination registers. Destination-register identifiers are positionally assigned to each operation, so the operations do not need to identify their corresponding destination register. On the other hand, each operation identifies source operands by selecting among the source-register identifiers and destination-register identifiers in the register access field. This scheme also allows identifying the destination register of one operation as a source register of another operation (in left-to-right order).

The solution proposed by Johnson, M., Superscalar Microprocessor Design, supra, has as many destination-register identifiers as primitive operations, so that the associated ports and fields are used inefficiently whenever there is an operation in the long-instruction which does not generate a result to be placed in the register file (such as a store operation, or some forms of compare operations which place the result in a condition register instead of the register file). Moreover, any of the register-identifiers in the register access field is used as source for any of the operations in the long instruction, leading to a rather complex network for routing operands from the register file to the functional units. This aspect is briefly mentioned by the Johnson publication, but no solution for it is described.

Partitioned register files have been addressed by Colwell, Robert P., et al., *A VLIW Architecture for a TRACE Scheduling Compiler*, Proceedings of the Second International Conference on Architectural Support for Programming Languages and Operating Systems, 1987, at 180–192, and by Beck, G., Yen, D., & Anderson, T., *The Cydra 5 Minisupercomputer: Architecture and Implementation*, The Journal of Supercomputing, 1993, Vol. 7 at 143–180. The partitioned register file used by Colwell et al. and by Beck, Yen, & Anderson, is a feasible solution regarding the implementation of a register file with many ports. However, such an approach introduces additional complexities in the code generation process. For example, (1) the compiler/programmer needs to ensure that operands are available in the corresponding register file module at the right moment, and (2) overhead is introduced by the extra operations needed to move/copy the operands across the different register file modules. In the case of replicated registers, the approach is more costly because it needs larger hardware resources (area, transistors, wires), uses more power, etc.

Therefore, a need exists for a system and method for efficient use of identifiers to reduce encoding needs and ports to shared resources in a processor.

SUMMARY OF THE INVENTION

The present invention relates to an operation decoder having a defined scheme for processing an instruction packet with shared identifier fields. The operation decoder includes a consumer signal for controlling a plurality of consumers, indicating the operation to be performed by each consumer. The operation decoder also includes a routing signal for controlling selectors, the selectors for routing values read from, and written to, a shared resource and the consumers. Further, the operation decoder includes an enable signal for enabling write ports in the shared resource for saving inputs to the shared resource.

According to one embodiment of the present invention, a method for accessing elements from a shared resource to be used by consumers that perform actions according to corresponding operations is disclosed. The method creates a packet of operations to be processed simultaneously, wherein the elements from the shared resource used by the operations are specified by source and destination identifier fields that are shared among the operations in such a way that the sum of all the elements from the shared resource used by the operations does not exceed a total number of identifiers available in the packet. The method also reads the elements from the shared resource according to the shared identifier fields specified in the packet. The method decodes a number of elements from the shared resource needed by each operation, by passing the operations to an operation decoder having a defined routing scheme based on the needs of the operations. The method routes the elements to the consumers performing operations and resulting values to the shared resource, according to a routing signal of the operation decoder.

The operation decoder described above specifies operations to be performed by the consumers according to a consumer signal from the operation decoder, as determined by the operation decoder.

According to the method, write ports of the shared resource are enabled to save the values according to an enable signal of the operation decoder, as determined by the operation decoder.

The method compiles the packet of operations so that the elements share identifier fields. The method determines the number of source identifier fields for elements, based on the operation to be performed, and further, determines the number of destination identifier fields for elements, based on the operation to be performed. The method also determines the needs of the operations to be placed in the packet and groups the operations so that the needs for elements are within the number of identifier fields available in the packet.

Further, if the needs of the operations to be grouped exceed the number of identifier fields available, the method removes one operation and inserting another operation having no needs. Alternatively, if the needs of the operations to be grouped exceed the number of identifier fields available, the method removes one operation and inserting another operation having needs which fit within the number of identifier fields available when inserted in the packet.

The method routes the elements as follows. The method signals a first selector disposed between the shared resource and the consumers, the signal being based upon the defined routing scheme saved in the operation decoder. The method also signals a second selector disposed between the consumers and shared resource, the signal being based upon the defined routing scheme saved in the operation decoder.

According to the method, the packet with shared identifier fields includes a source registers field, including source address information for the elements read concurrently from the shared resource, a destination registers field, including destination address information for the values from the consumers to be saved in the shared resource, and an operations field, including the operations to be performed using the elements.

The method uses the defined scheme of the operation decoder including a consumer lookup table having possible routes for elements from the shared resource to the consumers, based on each operation's individual needs. The scheme also has a write port lookup table having possible routes for the values from the consumers to write ports in the shared resource where the values are to be saved, based on each operation's individual needs. The scheme further includes a set of logic equations for controlling the routing of the elements from the shared resource to the consumers, and the values from the consumers to the shared resource.

According to the method the shared resource can be a register rename buffer or a register file. Further, consumers can be renaming engines or functional units. According to the method the elements are operands.

Alternatively, the method may be carried out by a computer usable medium having computer readable program code.

In a preferred embodiment of the present invention, a processor for executing an instruction packet having a plurality of operations sharing identifier fields is disclosed. The processor includes an instruction register for accepting the instruction packet. The processor includes a register file with a reduced number of ports accessed by a source register field from the instruction packet. The register file accepts an enable signal from an operation decoder for enabling write ports on the register file. The processor further includes the operation decoder having a defined scheme for routing operands from the register file to the consumers and routing values from the consumers to the register file. The processor includes a first selector for accepting the operands from the register file and for routing the operands from the first selector to the corresponding consumer according to a routing signal from the operation decoder. The processor includes the consumers for accepting the operands from the first selector and performing an operation according to an operation signal from the operation decoder. Also included in the processor is a second selector for accepting the values from the consumers and for routing the values to a corresponding write port in the register file according to the routing signal from the operation decoder.

According to the above embodiment, the processor further includes an instruction fetch unit for fetching the instruction packet from an instruction cache interfaced with the processor.

The register file further includes enable ports for accepting the enable signal from the operation decoder, and write ports for accepting the values from the second selector, the values to be stored in the register file.

The first selector and the second selector apply a combinational logic to the operands and the values respectively.

The consumers can be renaming engines or functional units.

The processor can be a dynamically-scheduled out-of-order execution processor or a statically-scheduled in-order execution processor.

According to another embodiment of the present invention, a method for accessing elements from a shared resource to be used by consumers that perform actions according to corresponding operations is disclosed. The method creates a packet of operations to be processed simultaneously, wherein the elements from the shared resource used by the operations are specified by source and destination identifier fields that are shared among the operations, in such a way that the sum of all the elements from the shared resource used by the operations does not exceed a total number of identifiers available in the packet. The method reads the elements from the shared resource according to the shared identifier fields specified in the packet. The method also decodes a number of elements from the shared resource needed by each operation, by passing the operations to an operation decoder having a defined routing scheme based on the needs of the operations. Further, the method routes the elements read from the shared resource to the corresponding consumers, as determined by the decoding of the operations in the operation decoder having the defined routing based on the needs of the individual operations. The method specifies to the consumers the specific operation to be performed by each consumer with the corresponding elements from the shared resource, as determined by the operation decoder. The method routes a plurality of values generated by the consumers to the shared resource, as determined by the operation decoder and specifies to the shared resource the placement of the values generated by the consumers according to the destination identifier fields specified in the packet of operations. The method also enables the shared resource to save the results from the consumers, as determined by the operation decoder.

According to the above embodiment, the method compiles the packet of operations so that the elements share the identifier fields. The method determines a number of source identifier fields for elements, based on the operation to be performed. The method determines a number of destination identifier fields for elements, based on the operation to be performed. Further, the method determines the needs of the operations to be placed in the packet, and groups the operations so that the needs for the elements are within the number of identifier fields available in the packet.

During compiling, if the needs of the operation to be grouped exceed the number of identifier fields available, removing one operation and inserting another operation having no needs. Alternatively, if the needs of the operations to be grouped exceed the number of identifier fields available, removing one operation and inserting another operation having needs which fit within the number of identifier fields available when inserted in the packet.

The step of routing the elements further includes signaling a first selector disposed between the shared resource and the consumers, the signal being based upon the defined routing scheme saved in the operation decoder, and signaling a second selector disposed between the consumers and the shared resource, the signal being based upon the defined routing scheme saved in the operation decoder.

The packet with shared identifier fields includes a source registers field, including source address information for the elements read concurrently from the shared resource, a destination registers field, including destination address information for the values from the consumers to be saved in the shared resource, and an operations field, including the operations to be performed using the elements.

The defined scheme of the operation decoder includes a consumer lookup table having possible routes for elements from the shared resource to the consumers, based on each operation's individual needs, a write port lookup table having possible routes for the values from the consumers to a plurality of write ports in the shared resource where the values are to be saved, based on each element's individual needs, and a set of logic equations for controlling the routing of the elements from the shared resource to the consumers, and the values from the consumers to the shared resource.

The shared resource is a register rename buffer or a register file. The consumers are renaming engines or functional units. According to the method the elements are operands.

These and other objects, features, and advantages of the present invention will become apparent from the following detailed description of illustrative embodiments thereof, which is to be used in connection with the accompanying drawings.

BRIEF DESCRIPTION OF THE DRAWINGS

Preferred embodiments of the present invention will be described below in more detail with reference to the accompanying drawings.

Reference numerals appearing in more than one figure indicate the same, or a corresponding element.

DETAILED DESCRIPTION OF PREFERRED EMBODIMENTS

The present invention includes a data structure or packet which includes multiple operations sharing identifier fields. Such a structure may be processed by routing logic, permitting multiple operations to be efficiently executed simultaneously. The present invention will now be described in detail below.

It is known in the art that not all the instructions in a processor always use the same number of elements from shared resources, for example, not all instructions use the same number of registers from a register file. The present invention takes advantage of this by providing a processor with reduced encoding by employing a preset line assignment method to a long-instruction packet having multiple operations sharing identifier fields. The preset line assignment enables the present invention to process multi-instruction packets using a decoder needing fewer ports than a comparable multi-instruction decoder. The present invention thus optimizes demands for ports to the shared resource and for encoding bits in the packet, by enforcing constraints in the creation of the instruction packets and the utilization of routing logic in processing of the instruction packet.

Figure 2:
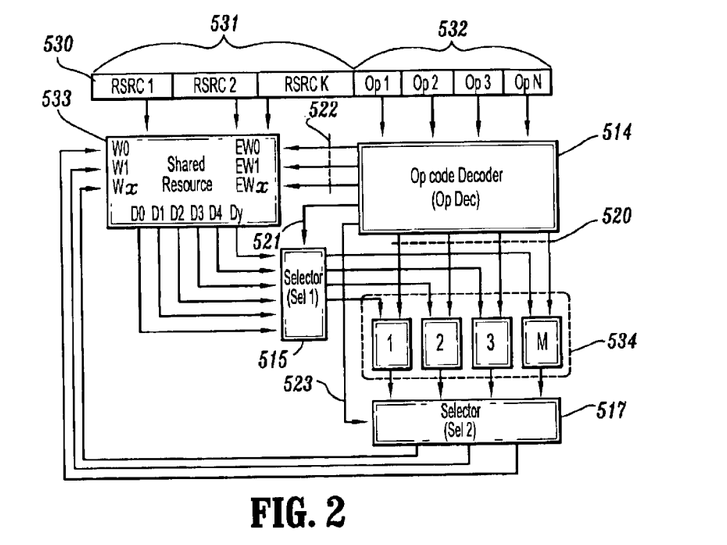
FIG. 2 is a diagram showing an example of packet processing according to one embodiment of the present invention.

The present invention is described with reference to FIG. 2, which depicts a general embodiment in the context of a processor capable of processing a packet 530 containing multiple operations 532. The packet of operations 530 has the format show in FIG. 3, including several fields describing the operations 532 that the packet is to perform, and fields containing identifiers for the elements 531 from a shared resource 533 which are used by the operations 532. In the prior art, each operation is granted access to elements from the shared resource regardless of whether all such elements were actually required for the operation or not. The present invention, as illustrated by FIG. 2, avoids the waste of encoding space and paths to access the elements from the shared resource 533 by introducing constraints on how the elements from the shared resource are specified by the consumers 534 of the elements.

Note that, despite having N operations 532 that can use multiple elements from the shared resource 533, there are only K identifiers 531 of said elements, with K smaller than N times the maximum number of the elements used by each operation 532. This is a predefined restriction. In other words, the entire set of operations 532 in a packet 530 may not specify more than K elements from the shared resource 533. As a result, the number of ports needed to access the shared resource 533 is determined by K, the number of identifiers 531, and there is no contention or conflict in accessing those ports. Advantageously, there is no need for arbitration logic, instead, routing logic 514, 515 and 517 is used to transfer the elements from the shared resource 533 to the consumers 534 of those elements, and the output from the consumers 534 of those elements into the shared resource 533.

The operation of a processor incorporating one embodiment of the present invention is as follows. The operation decoder 514 decodes the operations 532 and determines how many elements from the shared resource 533 are used by each individual operation. The decoder 514 generates four sets of outputs 520–523. Set 520 corresponds to control signals for M consumers 534 of the elements from the shared resource 533, indicating the specific action to be performed by each consumer 534. Set 521 corresponds to a control signal for a first selector 515, indicating the routing of the elements from the shared resource 533 through the selector 515 to the corresponding consumers 534 where such elements are used. Set 523 corresponds to a control signal for a second selector 517, indicating the routing of values generated by the consumers 534 through the selector 517 into the shared resource 533 where such values are saved. Set 522 corresponds to signals for enabling the saving of the values generated by the consumers 534 into the shared resource 533.

The present invention described herein can be used for different shared resources in a processor, depending on the processor organization and execution policy. For example, in the case of a statically-scheduled in-order execution processor, the invention can be used for sharing the ports to the register file. Alternatively, in the case of a dynamically-scheduled out-of-order execution processor, the invention can be used for sharing the ports to the rename register buffer, and the ports to the register file. In both cases, the invention can be used for sharing the ports to the data cache.

Figure 3:
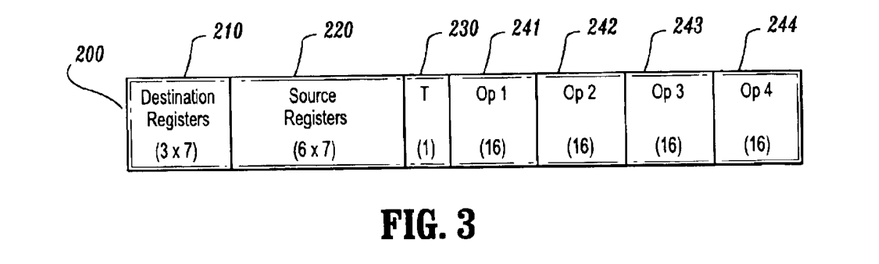
FIG. 3 is a diagram showing a format for a long instruction with shared identifier fields according to one embodiment of the present invention.

The present invention is further described with reference to an example in the context of the ports to a register file. In the example, the multi-operation packet illustratively includes four primitive operations. The number of operations may be increased or decreased according to the application. The associated register file is illustratively composed of 128 registers, so that each register identifier field has seven bits. Primitive operations may specify up to three source operands from the register file (the shared resource), and one destination register. The format of the long-instruction is depicted in FIG. 3. The long-instruction packet 200 illustratively includes: three identifier fields for destination registers 210, with seven bits per field; six identifier fields for source registers 220, with seven bits per field; a spare single bit field 230 usable for other purposes; and four fields for the primitive operations 241–244, with sixteen bits each. These numbers are illustrative and may be modified as needed.

Based on the number of operations per long-instruction, the number of registers and the length of the primitive operation fields, other values are possible for the length of the long-instruction packet. The present invention is not limited to the above example, as other packet lengths and configurations are contemplated by the method and system.

Note that, despite having four primitive operations 241–244 per packet 200, with up to three source operands each, there are only six source identifier fields 220 and only three destination identifier fields 210. In this example, a predefined (architecture) restriction enforced when the packets 200 are created. In other words, the entire long-instruction 200 may not specify more than six operands and three results in the register file for the four primitive operations. As a result, the number of ports needed in the register file is determined by these fields (six read and three write ports), and there is no contention or conflict in accessing those ports. Advantageously, there is no need for arbitration logic; instead, routing logic provided in FIGS. 7 & 9, and in the expressions below, are used to transfer operands from the register file 513 to the functional units 516, and results from the functional units 516 to the register file 513. See FIG. 6.

The number of source and destination register identifier fields, 220 and 210 respectively, (and consequently the number of read and write ports) actually needed by a given primitive operation is determined from the primary operations code (opcode) of each operation. In other words, a primitive operation is classified and assigned an opcode based on the number of operands used and results generated.

The creation of the packets 200 including the identifier fields 210, 220, and the enforcing of the restriction that the number of identifier fields 210, 220 needed in a packet 200 does not exceed the maximum allowed, can be performed either at compile time or at run time, depending on the features of the processor. In the case of a statically-scheduled in-order execution processor, which also includes VLIW processors, the packets can be created at compile time, or when the instructions are brought into the instruction cache, or when the packets are extracted from the instruction cache and brought into the processor. In this case, a packet is created only once, because the packet flows through the processor pipeline as a single entity. This is depicted in FIG. 4.

Figures 4, 5:
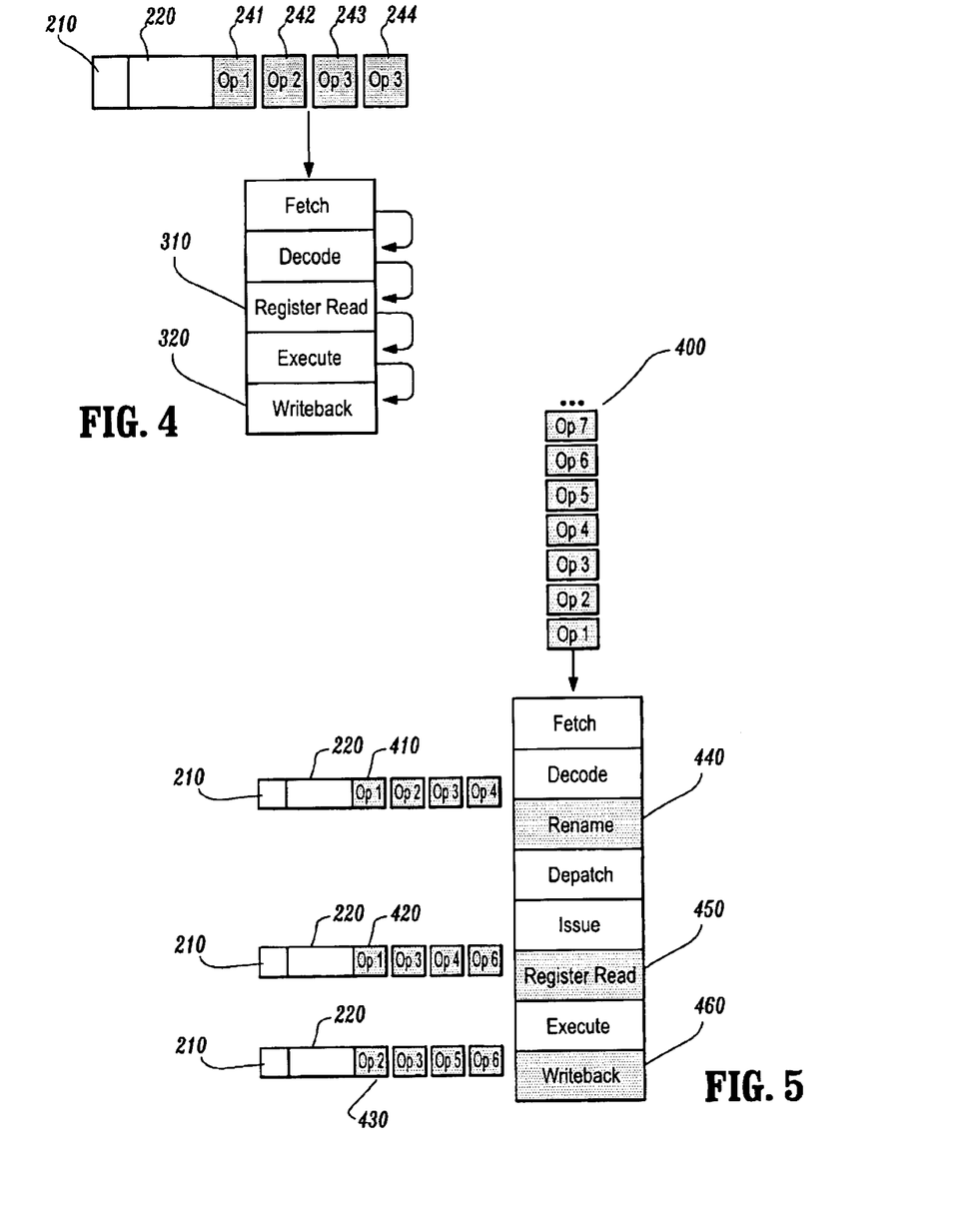
FIG. 4 is a diagram showing a statically-scheduled in-order execution processor according to one embodiment of the present invention.
FIG. 5 is a diagram showing a dynamically-scheduled, out-of-order execution process according to one embodiment of the present invention.

In FIG. 4, the instruction packet, including operations Op1 (241), Op2 (242), Op3 (242) and Op4 (244), move in lockstep through the five-stage processor pipeline shown, wherein the packet passes through one stage per cycle. In the prior art, sufficient register ports would be needed in the register file so that at the Register Read stage 310, each of the four operations would be able to simultaneously read from the register file the maximum number of values (typically two per operation). Likewise, at the Writeback stage 320, each of the four operations would be able to simultaneously write into the register file the maximum number of values (typically one per operation). According to the present invention, the four operations share a set of six read ports to the register file associated with the six source register identifier fields 220, and three write ports to the register file associated with the three destination register identifier fields 210. These identifiers are used at the Register Read stage 310 and the Writeback stage 320, respectively.

Alternatively, for the case of a dynamically-scheduled out-of-order execution processor, there are multiple shared resources that are used by different packets throughout the pipeline. For example, the operations 241–244 in a packet 200, that access the rename buffer in a given cycle may be grouped differently from the operations grouped for accessing the register file, depending on the dynamic scheduling of operations. In this case, as shown in FIG. 5, for a processor pipeline with eight stages, a packet 410 is constructed prior to renaming the registers in the Register Rename stage 440, a different packet 420 can be constructed prior to reading arguments from the register file in the Register Read stage 450, and yet another different packet may be constructed prior to writing results into the register file in the Writeback stage 460.

The overall operation of a processor incorporating the present invention will now be described in greater detail in an illustrative example. The example includes a statically-scheduled in-order execution processor, where operations to be executed simultaneously are grouped together by the compiler, and are encoded as a single entity called a "long-instruction." However, those skilled in the art can infer from this description of the present invention, an embodiment for a dynamically-scheduled out-of-order execution processor.

Figure 6:
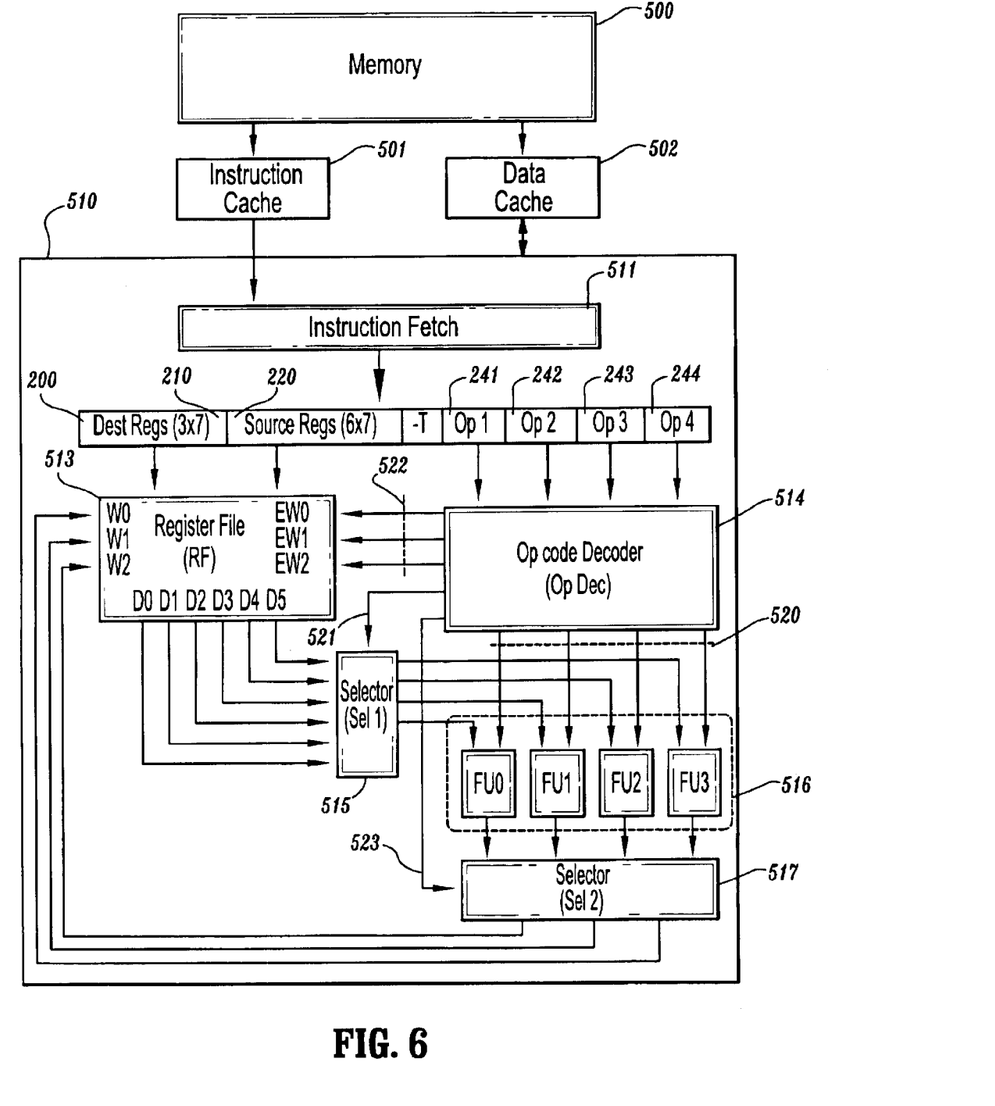
FIG. 6 is a diagram showing an example of processor organization according to one embodiment of the present invention.

The exemplary description considers a processor capable of processing four operations simultaneously, however, other processors capable of handling a different number of operations are contemplated by the present invention. This processor organization is depicted in FIG. 6. It is to be understood that the present invention may be implemented in various forms of hardware, software or a combination thereof. Preferably, these elements are implemented in hardware in one or more appropriately programmed general purpose digital computers having processor and memory and input/output interfaces.

Referring to FIG. 6, a functional block diagram is shown illustrating a processing system in accordance with the present invention. The processing system includes a processor unit 510 and an associated memory unit 500. The memory unit 500 holds program data and instructions to be executed on the processor unit 510. As is conventional, the memory unit 500 is interfaced with an instruction cache unit 501 and a data cache unit 502 such that frequently used instruction and data portions of the memory unit 500 are kept in an instruction cache unit 501 and data cache unit 502, respectively. Alternatively, the instruction and data cache units 501, 502 may be merged into a single unified cache. Access time for the cache units 501, 502 may be much smaller than that of the memory unit 500. The instruction cache and/or data cache units 501, 502 may also be comprised of multiple caches or multilevel caches as is known in the art.

The instructions/data stored in the instruction cache 501 and data cache 502, respectively, are divided into lines (referred to as blocks). An instruction fetch unit 511 fetches one long-instruction from the instruction cache 501 and places it into the long-instruction register (LIR) 200. The contents of the source register fields specified in LIR 200 are used to access a register file (RF) 513. The contents of the primitive operation fields 241–244 in LIR 200 are used as inputs to an opcode decoder. (OpDec) 514.

The decoder 514 generates four sets of outputs, 520, 521, 522 and 523 respectively. Set 520 corresponds to control signals for four functional units (FUs) 516, indicating the specific operation to be performed by each unit. Set 521 corresponds to a control signal for a first selector (Sel1) 515, indicating the routing of the values read from the register file (RF) 513 through the selector 515 to the corresponding functional units 516 where such values are needed. Set 523 corresponds to a control signal for a second selector (Sel2) 517, indicating the routing of the values computed in the functional units 516 through the selector 517 to the register file 513 where such values are stored. Set 522 corresponds to enable signals for the write ports W0, W1, and W2 in register file 513. When EW0, EW1, and EW2 are enabled, the values present at the inputs to W0, W1, and W2, respectively, are saved in the register file 513. The outputs from selector 515 are connected to the inputs to the corresponding functional units 516, whereas the outputs from selector 517 are associated with the corresponding destination register fields specified in LIR 200, and are connected to the inputs W0, W1, and W2 to the register file 513.

The functional units 516 in FIG. 6 are assumed to take one cycle to complete their operation. If they took more than one cycle, say N cycles, then a queue of length N−1 is placed on signals 523 going from OpDec 514 to Sel2 517. In this way, the destination selection is delayed until the outputs from the functional units 516 are ready to be saved in the register file 513. A buffer of length N−1 is also needed for signals 522 from OpDec 514 to the register file 513 to delay until the proper time, the saving of the values at W0, W1, and W2 at the input of the register file 513.

An exemplary functionality of the opcode decoder (OpDec) 514 included in FIG. 6 will now be illustrated in terms of the register file read accesses for the case of non-homogeneous functional units (FU). In particular, this example assumes that FU0 and FU2 perform operations with at most two operands, whereas FU1 and FU3 perform operations with up to three operands. This example of the functionality implemented by OpDec 514 is specified by the table depicted in FIG. 7. One skilled in the art will recognize that similar tables can be constructed for packets having different requirements, such as the size of the identifier fields and the number of operations.

For each possible number of source operands 600 in each primitive operation 241–244, this table indicates the register field specifying the corresponding operands; in the case that the primitive operations in LIR 200 specify fewer than six operands, some of the register fields are simply ignored. Using the third row 610 of FIG. 7 and the structure of FIG. 6, if no source operands are needed 611 in FU0, two operands are needed 612 in FU1, three operands are needed 613 in FU2, and zero or one operand is needed 614 in FU3, then these six operands (2+3+1) are specified in the register fields as follows: D0 and D1 specify the two operands for FU1 621; D3, D2, and D4, in that order, specify the three operands for FU2 622; and D5 specifies the single operand for FU3 623. Similar information is included in the table for the other combinations of input operands.

Figure 7:
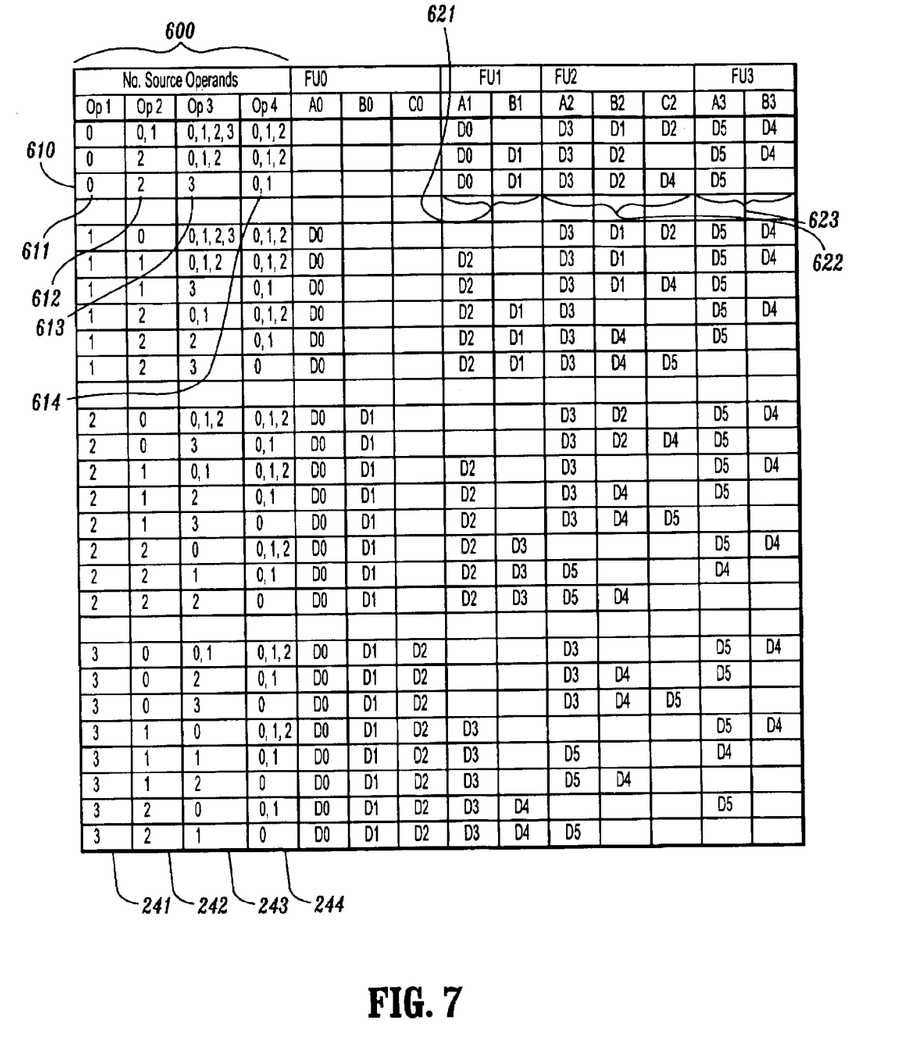
FIG. 7 is a table describing functionality of an opcode decoder (OpDec) according to one embodiment of the present invention.
Figure 8:
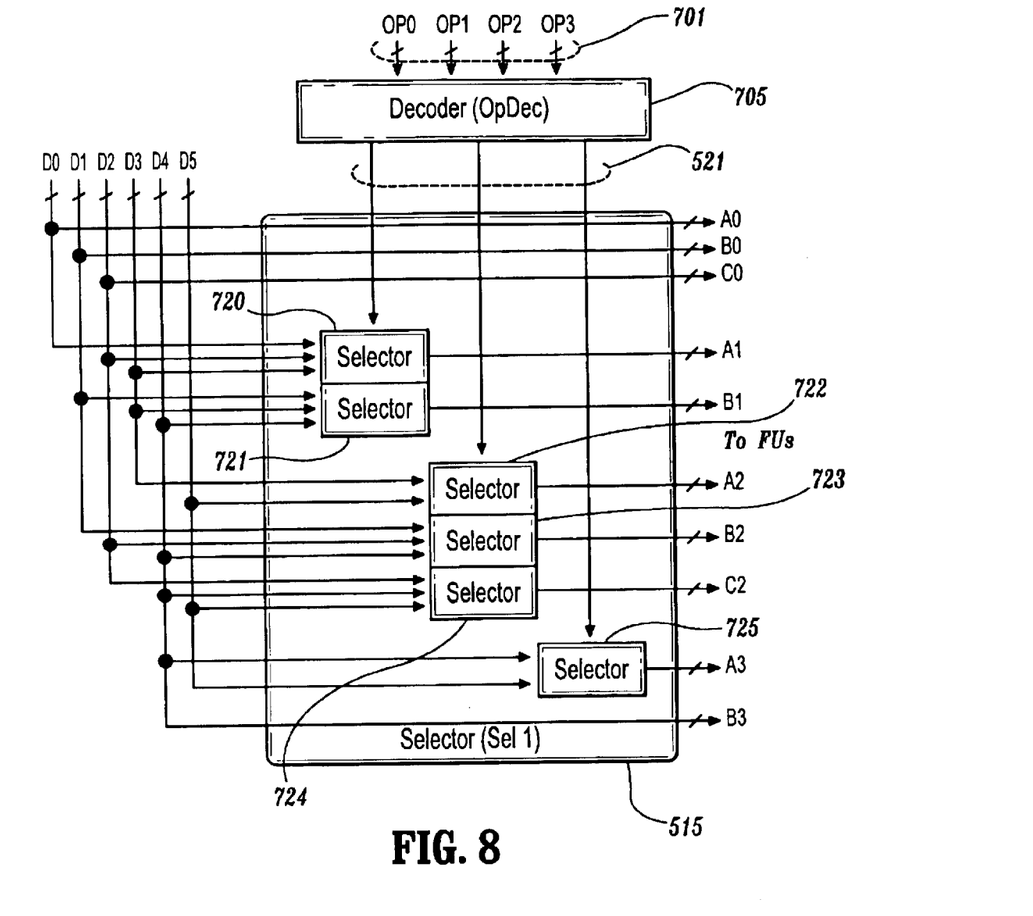
FIG. 8 is a diagram of a combinational logic implementing functionality of OpDec according to one embodiment of the present invention.

The functionality expressed by the table in FIG. 7 can be implemented with the simple combinational logic described in FIG. 8. All primitive operations 701 are input to a decoder 705, which generates signals 521 or the control of individual selectors 720 through 725 within the selector 515. As specified by the corresponding columns in the table in FIG. 7, the inputs to FU0 are assigned register fields D0, D1, and D2, respectively, so there is no selection on those signals. In contrast, input A1 (to FU1) is assigned either register fields D0, D2, or D3, whereas input B1 (also to FU1) is assigned either D1, D3, or D4. This corresponds to the logic expressions listed below for A1 and B1, and is implemented by selectors 720 and 721.

Accordingly, the present invention is able to process multi-instruction packets while reducing encoding typically associated with multi-instruction packets. The present invention accomplishes this goal using a predetermined port assignment or routing scheme which enables operations within a packet to share resources. Another advantage of the present invention is that it uses fewer ports to register file and other shared resources, with little or no loss of performance.

Figure 9:
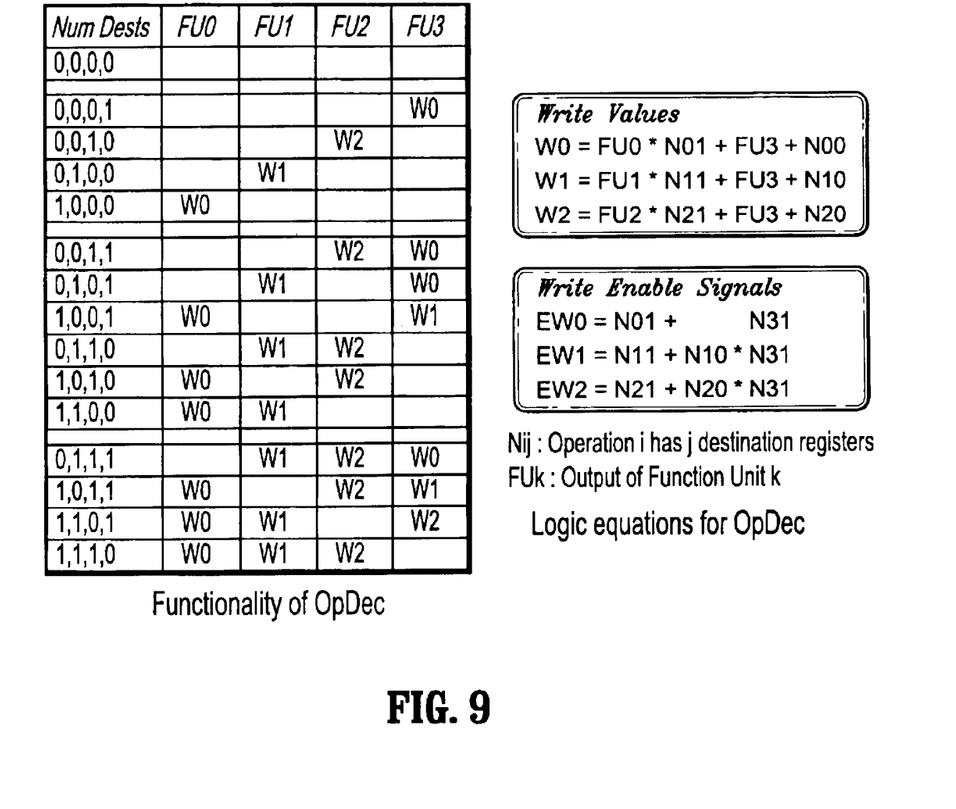
FIG. 9 is a table showing register file write accesses according to one embodiment of the present invention.

The following expression shows illustrative logic equations for OpDec for register file read access:

$A_0 = D_0$
$B_0 = D_1$
$C_0 = D_2$
$A_1 = D_0 N_{00} + D_2 (N_{01} + N_{02}) + D_3 N_{03}$
$B_1 = D_1 (N_{00} + N_{01}) + D_3 N_{02} + D_4 N_{03}$
$A_2 = D_3 (N_{00} + N_{01} + N_{02} N'_{12} + N_{03} N_{10}) + D_5 (N_{02} N_{12} + N_{03} N'_{10})$
$B_2 = D_1 (N_{00} N'_{12} + N_{01} N'_{12}) + D_2 (N_{00} N_{12} + N_{02} N_{10}) + D_4 (N_{01} N_{12} + N_{02} N'_{10} + N_{03})$
$C_2 = D_2 (N_{00} N'_{12} + N_{01} N_{10}) + D_4 (N_{00} N_{12} + N_{01} N_{11} + N_{02} N_{10}) + D_5 (N_{01} N_{12} + N_{02} N_{11} + N_{03})$
$A_3 = D_4 (N_{02} N_{12} N_{21} + N_{03} N_{11} N_{21}) + D_5 (N_{00} + N_{01} + N_{02} N'_{12} + N_{02} N_{12} N_{20} + N_{03} N'_{10} + N_{03} N_{11} N_{20})$
$B_3 = D_4$ wherein
$N_{ij}$ : operation i has j source registers
$D_k$ : output k from register file Referring to FIG. 9, an illustrative example of how outputs from functional unit 516 are routed by selector 517 to register file 513 is shown. The output of FU0 always goes to the W0 input in the register file 513, the output of FU1 always goes to the W1 input, and the output of FU2 always goes to the W2 input. The output of FU3 goes to W0, W1, or W2 depending on which is not being used for the output of FU0, FU1, and FU2. Sometimes, there is no input for W0, W1, or W2, as for example when none of the functional units FU0, FU1, FU2, and FU3 produce an output. The enable signal 522, described by the logic equations in FIG. 9, control whether the values at the inputs of the register file 513 are saved in the register file 513. For example, the input at W0 is saved whenever FU0 has a destination value or whenever FU3 has a destination value, as indicated by the corresponding enable signal 522 (EW0, specifically).

The contents of the tables in FIGS. 7 and 9, and the associated expressions above are just examples of one implementation of the present invention. Those skilled in the art will recognize that other assignments are possible. Assignments depend on, for example, the number of ports in the register file and the number of possible operands for the functional units.

Figure 10:
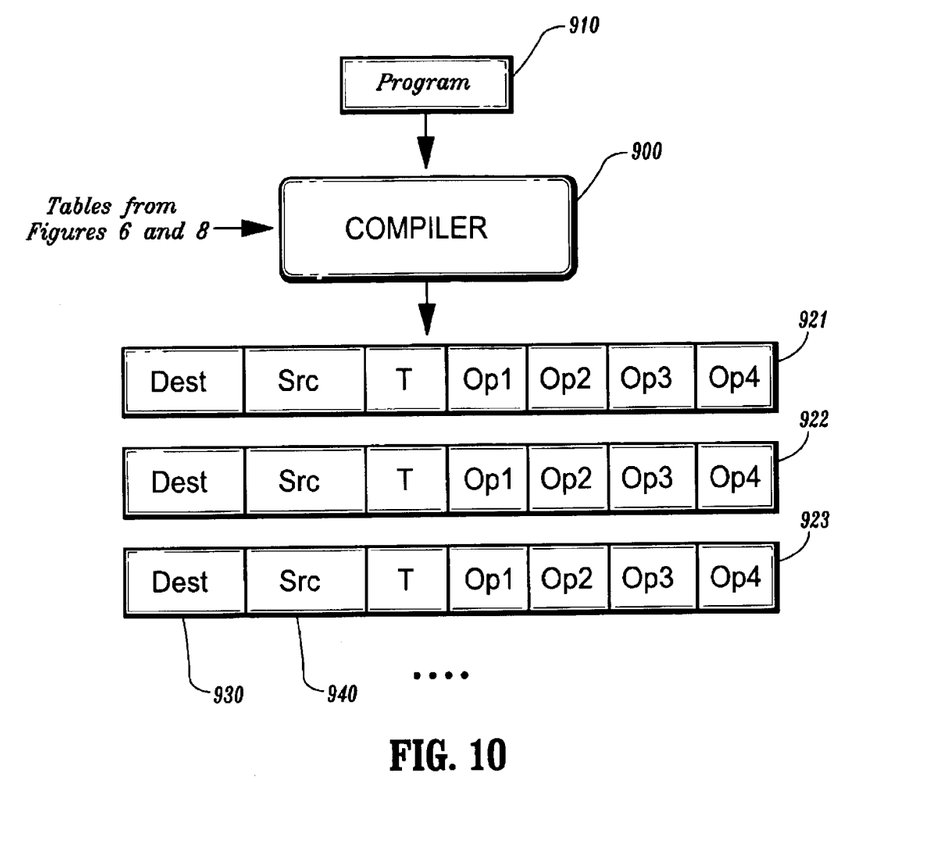
FIG. 10 is a diagram showing the creation of an instruction packet according to one embodiment of the present invention.

FIG. 10 shows how packets 921–923 can be created by a compiler 900. A program 910 written in any programming language, such as for example, C, C++, Java, or FORTRAN, is transformed into operation packets 921–923 by the compiler 900. In creating the packets 921–923, the compiler 900 considers the contents of the tables in FIGS. 7 and 9, and the logic expressions above. The compiler 900 is therefore able to place operations Op1, Op2, Op3, and Op4 in each packet 921–923 which all together do not need more source or destination registers than those that fit in the destination (Dest) 930 and Source (Src) 940 fields of each packet 921–923. The compiler 900 uses the tables and associated logic expressions as well as the association between the register identifier fields in the Dest 930 and Src 940 portions of each packet and the registers needed by operations Op1, Op2, Op3, and Op4, thus placing the proper values in each field.

Using the example of a packet above, in some instances the compiler can encounter four operations which together, need more then the six source registers available. In this case, the compiler can drop the fourth operation and insert a no operation (no-op) which comprises no operation, functioning as a placeholder, thus the total needs of the four operations in the packet do not exceed the available number of ports needed (six sources in the example). Alternatively, the compiler may seek out an operation to replace one of the four operations, so that the needs of the new arrangement of four operations are within the predefined limitations of the identifier fields.

An alternative embodiment to that in FIG. 10 would replace the compiler 900 with hardware which dynamically creates packets as the program runs on a processor. The packets could be created either prior to being placed in the instruction cache, or in a pipeline stage. Since there may be constraints (hardware and/or timing) for creating the packets dynamically, the hardware embodiment may be restricted to select the operations to place in a packet only from adjacent operations in the execution stream, potentially leading to lower utilization of the resources in the processor but preserving the simplicity of the invention.

This invention includes potential use, such as, in any processor family that includes long-instruction implementations, wherein the long instructions are created at program generation or dynamically before operation execution.

Having described a method and apparatus for a long-instruction packet with shared identifier fields, it is noted that modifications and variation can be made by persons skilled in the art in light of the above teachings. It is therefore to be understood that changes may be made in the particular embodiments of the invention disclosed which are within the scope and spirit of the invention as defined by the appended claims.

What is claimed is:

1. A method for accessing a plurality of elements from a shared resource to be used by a plurality of consumers that perform actions according to a plurality of corresponding operations, comprising the steps of:

creating a packet of operations to be processed simultaneously, wherein the elements from the shared resource used by the operations are specified by a plurality of source and destination identifier fields that are shared among the operations in such a way that the sum of all the elements from the shared resource used by the operations does not exceed a total number of identifiers available in the packet;

reading the elements from the shared resource according to the shared identifier fields specified in the packet;

decoding a number of elements from the shared resource needed by each operation, by passing the operations to an operation decoder having a defined routing scheme based on the needs of the operations; and routing the elements to the consumers performing operations and a plurality of resulting values to the shared resource, according to a routing signal of the operation decoder.

2. The method of claim 1, wherein the operation decoder specifies operations to be performed by the consumers according to a consumer signal from the operation decoder, as determined by the operation decoder.

3. The method of claim 1, wherein a plurality of write ports of the shared resource are enabled to save the values according to an enable signal of the operation decoder, as determined by the operation decoder.

4. The method of claim 1, wherein the packet of operations is compiled having the plurality of elements sharing the identifier fields, comprising the steps of:

determining the number of source identifier fields for elements, based on the operation to be performed;

determining the number of destination identifier fields for elements, based on the operation to be performed;

determining the needs of the operations to be placed in the packet; and grouping the operations so that the needs for elements are within the number of identifier fields available in the packet.

5. The method of claim 4, further comprising the step of:

if the needs of the operations to be grouped exceed the number of identifier fields available, removing one operation and inserting another operation having no needs.

6. The method of claim 4, further comprising the step of:

if the needs of the operations to be grouped exceed the number of identifier fields available, removing one operation and inserting another operation having needs which fit within the number of identifier fields available when inserted in the packet.

7. The method of claim 1, wherein the step of routing the elements further comprises the steps of:

signaling a first selector disposed between the shared resource and the consumers, the signal being based upon the defined routing scheme saved in the operation decoder; and signaling a second selector disposed between the consumers and shared resource, the signal being based upon the defined routing scheme saved in the operation decoder.

8. The method of claim 1, wherein the packet with shared identifier fields comprises:

a source registers field, including source address information for the elements read concurrently from the shared resource;

a destination registers field, including destination address information for the values from the consumers to be saved in the shared resource; and an operations field, including the operations to be performed using the elements.

9. The method of claim 1, wherein the defined scheme of the operation decoder comprises:

a consumer lookup table having possible routes for elements from the shared resource to the consumers, based on each operation's individual needs;

a write port lookup table having possible routes for the values from the consumers to a plurality of write ports in the shared resource where the values are to be saved, based on each operation's individual needs; and a set of logic equations for controlling the routing of the elements from the shared resource to the consumers, and the values from the consumers to the shared resource.

10. The method of claim 1, wherein the shared resource is one of a register rename buffer and a register file.

11. The method of claim 1, wherein the consumers are one of renaming engines and functional units.

12. The method of claim 1, wherein the elements are operands.

13. The method of claim 1, further comprises a computer usable medium having computer readable program code embodied therein for performing the method steps.

14. A processor for executing an instruction packet having a plurality of operations sharing identifier fields, comprising:

an instruction register for accepting the instruction packet;

a register file with a reduced number of ports accessed by a source register field from the instruction packet, the register file accepting an enable signal from an operation decoder for enabling a plurality of write ports on the register file;

the operation decoder having a defined scheme for routing a plurality of operands from the register file to a plurality of consumers and routing a plurality of values from the consumers to the register file;

a first selector for accepting the operands from the register file and for routing the operands from the first selector to the corresponding consumer according to a routing signal from the operation decoder;

the consumers for accepting the operands from the first selector and performing an operation according to an operation signal from the operation decoder; and a second selector for accepting the values from the consumers and for routing the values to a corresponding write port in the register file according to the routing signal from the operation decoder.

15. The processor of claim 14, further comprising an instruction fetch unit for fetching the instruction packet from an instruction cache interfaced with the processor.

16. The processor of claim 14, wherein the register file further comprises:

enable ports for accepting the enable signal from the operation decoder; and write ports for accepting the values from the second selector, the values to be stored in the register file.

17. The processor of claim 14, wherein the first selector and the second selector apply a combinational logic to the operands and the values respectively.

18. The processor of claim 14, wherein the consumers are one of renaming engines and functional units.

19. The processor of claim 14, wherein the processor is one of a dynamically-scheduled out-of-order execution processor and a statically-scheduled in-order execution processor.

20. A method for accessing a plurality of elements from a shared resource to be used by a plurality of consumers that perform actions according to a plurality of corresponding operations, comprising the steps of:

creating a packet of operations to be processed simultaneously, wherein the elements from the shared resource used by the operations are specified by a plurality of source and destination identifier fields that are shared among the operations, in such a way that the sum of all the elements from the shared resource used by the operations does not exceed a total number of identifiers available in the packet;

reading the elements from the shared resource according to the shared identifier fields specified in the packet;

decoding a number of elements from the shared resource needed by each operation, by passing the operations to an operation decoder having a defined routing scheme based on the needs of the operations;

routing the elements read from the shared resource to the corresponding consumers, as determined by the decoding of the operations in the operation decoder having the defined routing based on the needs of the individual operations;

specifying to the consumers the specific operation to be performed by each consumer with the corresponding elements from the shared resource, as determined by the operation decoder;

routing a plurality of values generated by the consumers to the shared resource, as determined by the operation decoder;

specifying to the shared resource the placement of the values generated by the consumers according to the destination identifier fields specified in the packet of operations; and enabling the shared resource to save the results from the consumers, as determined by the operation decoder.

21. The method of claim 20, wherein the packet of operations is compiled having the elements sharing the identifier fields, comprising the steps of:

determining a number of source identifier fields for elements, based on the operation to be performed;

determining a number of destination identifier fields for elements, based on the operation to be performed;

determining the needs of the operations to be placed in the packet; and grouping the operations so that the needs for the elements are within the number of identifier fields available in the packet.

22. The method of claim 21, further comprising the step of:

if the needs of the operation to be grouped exceed the number of identifier fields available, removing one operation and inserting another operation having no needs.

23. The method of claim 21, further comprising the step of:

if the needs of the operations to be grouped exceed the number of identifier fields available, removing one operation and inserting another operation having needs which fit within the number of identifier fields available when inserted in the packet.

24. The method of claim 20, wherein the step of routing the elements further comprises the steps of:

signaling a first selector disposed between the shared resource and the consumers, the signal being based upon the defined routing scheme saved in the operation decoder; and signaling a second selector disposed between the consumers and the shared resource, the signal being based upon the defined routing scheme saved in the operation decoder.

25. The method of claim 20, wherein the packet with shared identifier fields comprises:

a source registers field, including source address information for the elements read concurrently from the shared resource;

a destination registers field, including destination address information for the values from the consumers to be saved in the shared resource; and an operations field, including the operations to be performed using the elements.

26. The method of claim 20, wherein the defined scheme of the operation decoder comprises:

a consumer lookup table having possible routes for elements from the shared resource to the consumers, based on each operation's individual needs;

a write port lookup table having possible routes for the values from the consumers to a plurality of write ports in the shared resource where the values are to be saved, based on each element's individual needs; and a set of logic equations for controlling the routing of the elements from the shared resource to the consumers, and the values from the consumers to the shared resource.

27. The method of claim 20, wherein the shared resource is one of a register rename buffer and a register file.

28. The method of claim 20, wherein the consumers are one of renaming engines and functional units.

29. The method of claim 20, wherein the elements are operands.

* * * * *